Patented Nov. 25, 1947

2,431,468

UNITED STATES PATENT OFFICE 2,431,468

METHOD OF PREPARING UNSATURATED AMIDES

Harold S. Davis, Greenwich, Myrl Lichtenwalter, Old Greenwich, and Wolfgang M. Zeischke, Stamford, Conn., assignors to American Cyanamid Company, New York, N. Y., a corporation of Maine No Drawing. Application March 30, 1945, Serial No. 585,802

9 Claims. (Cl. 260—561)

1

The present invention relates to the production of unsaturated organic amides, and more particularly to a method of preparing an unsaturated amide of the formula:

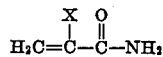

in which X represents a member of the group consisting of hydrogen and the methyl radical.

Heretofore it has been proposed to produce methacrylamide by treating acetone cyanohydrin with sulfuric acid at a temperature exceeding 100° C. and not higher than about 140° C. Isolation of the methacrylamide from the reaction mixture involves a slow and tedious procedure. For instance, the whole reaction mass is dissolved in water and a hydroxide or carbonate of an alkaline earth metal added to neutralize the sulfuric acid. The mixture is then filtered to remove the insoluble sulfate, and the aqueous solution evaporated to obtain a residue consisting mainly of methacrylamide. The crude material is then recrystallized from benzene to give a substantially pure product.

It has now been discovered that methacrylamide may be prepared in a simple and convenient manner by treating acetone cyanohydrin with sulfuric acid at a temperature not exceeding about 90° C. to form the mono-sulfuric acid ester of α-hydroxy, α-methyl propionamide, adding ammonium sulfate to the reaction menstruum to produce the ammonium salt of the monosulfuric acid ester, heating the resulting mixture at a temperature sufficient to decompose the ammonium salt and thus form methacrylamide and ammonium bisulfate, and distilling the methacrylamide therefrom.

The reactions involved in the preparation of methacrylamide according to the present invention may be outlined as follows:

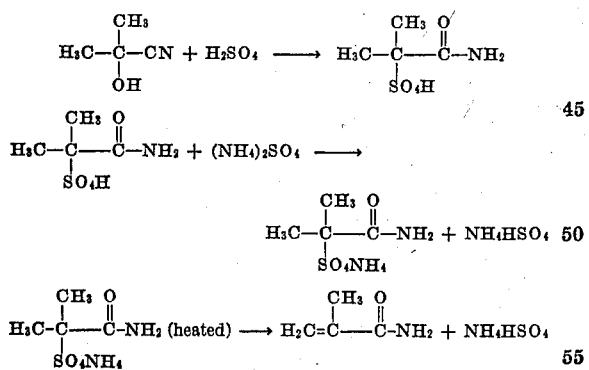

2

In like manner acrylamide may be prepared by treating ethylene cyanohydrin with sulfuric acid at a temperature not exceeding about 90° C. to form the mono-sulfuric acid ester of β-hydroxypropionamide, adding ammonium sulfate to the reaction menstruum to produce the ammonium salt of the mono-sulfuric acid ester, heating the resulting mixture at a temperature sufficient to decompose the ammonium salt and thus form acrylamide and ammonium bisulfate, and distilling the acrylamide therefrom.

In step 1 of the process, the sulfuric acid may be used in excess of one mol of cyanohydrin to one mol of acid depending on the desired fluidity of the product. When this is done, an additional quantity of ammonium sulfate should be used in step 2 to convert the excess acid to ammonium bisulfate.

In carrying out the process, the cyanohydrin and sulfuric acid are mixed together, preferably by slowly adding the cyanohydrin to the acid with good stirring. The temperature of the reaction mixture is not allowed to exceed about 90° C., and is maintained preferably within the range of 40°–90° C. Solid ammonium sulfate is then added to the reaction menstruum with stirring in an amount sufficient to convert the monosulfuric acid ester of the hydroxypropionamide to the corresponding ammonium salt and also to convert any excess sulfuric acid to ammonium bisulfate. The resulting mixture is heated to a temperature within the range of 130°–175° C., and preferably under reduced pressure in a vessel so arranged that the unsaturated amide as it is formed may be distilled away from the ammonium bisulfate.

In the above procedure, the mono-sulfuric acid ester of the hydroxy-propionamide may also be converted to the corresponding ammonium salt either by adding gaseous ammonia thereto while removing the heat of partial neutralization, or by adding the reaction menstruum to well-stirred and well-cooled ammonium hydroxide.

The addition of metallic copper, sulfur or metallic sulfides prevents foaming in the last step of the process. These materials also function as antipolymerizing agents.

The following examples in which the parts are by weight further illustrate the invention:

Example 1

42.5 parts of pure distilled acetone cyanohydrin were added slowly to 98 parts of 100% sulfuric acid. The mixture was stirred and maintained at about 70° C. during the addition of the cyanohydrin. 140 parts of ammonium sulfate and 0.5 part of finely divided copper were then added with stirring. The pressure in the reaction vessel was reduced to about 3 mm., and the temperature of the reaction mixture raised to 130° C. Methacrylamide distilled rapidly from the mixture and was collected in an air-cooled condenser. 38.6 parts of methacrylamide, a white crystalline product melting at 110° C., were obtained. The yield was 91% of the theoretical, based on the amount of acetone cyanohydrin used.

Example 2

85 parts of acetone cyanohydrin were added in small portions to 196 parts of 100% sulfuric acid kept at 75° C. Following the addition of the cyanohydrin, there were added 280 parts of ammonium sulfate and 0.5 part of ferrous sulfide. The mixture was thoroughly agitated and then heated to 155° C. at a pressure of 2 to 3 mm. 75 parts of methacrylamide distilled from the mixture, giving a yield of 88%.

Example 3

720 parts of 98% ethylene cyanohydrin were added gradually to 1960 parts of 100% sulfuric acid maintained at about 40° C. The liquid product was allowed to stand at room temperature for five days.

85.5 parts of the above product were mixed with 110 parts of ammonium sulfate. The resulting mixture was heated at 155°–165° C. in a vessel in which the pressure was maintained at about 3 mm. 19.5 parts (82.5% yield) of acrylamide, a white flaky crystalline product melting at 85° C., were collected in an air-cooled condenser.

Example 4

71 parts of ethylene cyanohydrin were added slowly to 196 parts of 100% sulfuric acid during a period of twenty minutes, the mixture being held at a temperature between 75° and 80° C. 294 parts of ammonium sulfate were added to the mixture with stirring. During the addition of the ammonium sulfate, the temperature of the mixture was raised to 100° C. The pressure was reduced to 2-5 mm. and heating continued. At about 140° C. evolution of acrylamide was rapid. The temperature of the mixture was held at 140° C. for one half hour and then raised to 165° C. for forty-five minutes. 52 parts of acrylamide were collected.

Example 5

85 parts of acetone cyanohydrin were added drop-wise to 196 parts of 100% sulfuric acid at such a rate that the temperature of the mixture was maintained at 70°–80° C. The product which was liquid at room temperature was added slowly to 270 parts of chilled, well-stirred, concentrated ammonium hydroxide. The aqueous solution was evaporated to dryness at a temperature of 70°–75° C. under reduced pressure (water pump). The white solid residue was dried in a vacuum desiccator for 16 hours, and then extracted with hot methanol. Concentration and cooling of the methanol solution gave 150 parts of the ammonium salt of the mono-sulfuric acid ester of α-hydroxy, α-methyl propionamide, a white crystalline material melting at 175°–179° C. After one recrystallization from methanol, the product melted at 181°–182° C.

48 parts of the ammonium salt were placed in a distillation vessel fitted with an air-condenser, a stirrer and a thermometer. The vessel was placed in a heating bath at 180° C., and the pressure in the vessel reduced to about 6 mm. At an internal temperature of 140° C. some methacrylamide distillate appeared in the condenser. Heating was continued at 160° C. (in the vessel) until distillation stopped. 19.5 parts of methacrylamide were collected in the condenser.

Example 6

71 parts of ethylene cyanohydrin were added slowly to 147 parts of 100% sulfuric acid kept at 35°–40° C. The mixture was allowed to stand 24 hours at room temperature. It was then added slowly to a slight excess of cold concentrated ammonium hydroxide. The aqueous solution was evaporated under reduced pressure on a steam bath. The remaining solid residue was extracted with 600 parts of hot methanol. Cooling and filtering of the methanol solution gave 124 parts of the ammonium salt of the mono-sulfuric acid ester of β-hydroxypropionamide, a white crystalline material melting at 127–128.5° C.

20 parts of the ammonium salt mixed with 0.5 part of cuprous chloride (antipolymerizing agent) were heated at about 160° C. in a distillation vessel connected to an air-condenser under 3 mm. pressure. 6.5 parts of acrylamide were collected in the air-condenser.

The improved method herein described for the production of unsaturated amides possesses many advantages which will be apparent to those skilled in the art. The method is simple and easily operated. The desired amides are obtained in high yields and in substantially pure form. A further important advantage resides in the fact that the residual ammonium bisulfate may be treated with ammonia to form ammonium sulfate and part of the latter recycled in the process.

While the invention has been described with particular reference to specific embodiments, it is to be understood that it is not to be limited thereto but is to be construed broadly and restricted solely by the scope of the appended claims.

We claim:

1. A method of preparing an unsaturated organic amide of the formula

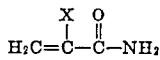

X being a member of the group consisting of hydrogen and the methyl radical, which includes the steps of treating a cyanohydrin chosen from the group consisting of ethylene cyanohydrin and acetone cyanohydrin with sulfuric acid at a temperature not exceeding about 90° C. to form the mono-sulfuric acid ester of the corresponding hydroxy propionamide, adding ammonium sulfate to the reaction menstruum to neutralize the same and form the ammonium salt of said mono-sulfuric acid ester, and heating the mixture at a temperature sufficient to produce the desired unsaturated amide.

2. A method of preparing an unsaturated organic amide of the formula

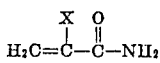

X being a member of the group consisting of hydrogen and the methyl radical, which includes the steps of treating a cyanohydrin chosen from the group consisting of ethylene cyanohydrin and acetone cyanohydrin with at least one molecular proportion of sulfuric acid at a temperature not exceeding about 90° C. to form the mono-sulfuric acid ester of the corresponding hydroxy propionamide, adding ammonium sulfate to the reaction menstruum to neutralize the same and form the ammonium salt of said mono-sulfuric acid ester, and heating the mixture at a temperature sufficient to produce the desired unsaturated amide.

3. A method of preparing an unsaturated organic amide of the formula

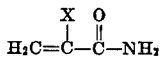

X being a member of the group consisting of hydrogen and the methyl radical, which includes the steps of treating a cyanohydrin chosen from the group consisting of ethylene cyanohydrin and acetone cyanohydrin with sulfuric acid at a temperature within the range of 40°–90° C. to form the mono-sulfuric acid ester of the corresponding hydroxy propionamide, adding ammonium sulfate to the reaction menstruum to neutralize the same and form the ammonium salt of said mono-sulfuric acid ester, and heating the mixture at a temperature sufficient to produce the desired unsaturated amide.

4. A method of preparing an unsaturated organic amide of the formula

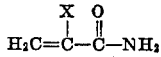

X being a member of the group consisting of hydrogen and the methyl radical, which includes the steps of treating a cyanohydrin chosen from the group consisting of ethylene cyanohydrin and acetone cyanohydrin with sulfuric acid at a temperature not exceeding about 90° C. to form the mono-sulfuric acid ester of the corresponding hydroxy propionamide, adding ammonium sulfate to the reaction menstruum to neutralize the same and form the ammonium salt of said mono-sulfuric acid ester, and heating the mixture at a temperature within the range of 130°–175° C.

5. A method of preparing an unsaturated organic amide of the formula

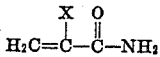

X being a member of the group consisting of hydrogen and the methyl radical, which includes the steps of treating a cyanohydrin chosen from the group consisting of ethylene cyanohydrin and acetone cyanohydrin with sulfuric acid at a temperature not exceeding about 90° C. to form the mono-sulfuric acid ester of the corresponding hydroxy propionamide, adding ammonium sulfate to the reaction menstruum to neutralize the same and form the ammonium salt of said mono-sulfuric acid ester, and heating the mixture at a temperature within the range of 130°–175° C., under a pressure less than atmospheric pressure.

6. A method of preparing an unsaturated organic amide of the formula

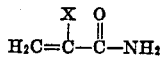

X being a member of the group consisting of hydrogen and the methyl radical, which includes the steps of treating a cyanohydrin chosen from the group consisting of ethylene cyanohydrin and acetone cyanohydrin with sulfuric acid at a temperature not exceeding about 90° C. to form the mono-sulfuric acid ester of the corresponding hydroxy propionamide, adding ammonium sulfate to the reaction menstruum to neutralize the same and form the ammonium salt of said mono-sulfuric acid ester, heating the mixture at a temperature sufficient to produce the desired unsaturated amide and distilling the unsaturated amide therefrom.

7. A method of preparing methacrylamide which comprises treating acetone cyanohydrin with at least one molecular proportion of sulfuric acid at a temperature not exceeding 90° C. to form the mono-sulfuric acid ester of the corresponding hydroxy propionamide, adding ammonium sulfate to the reaction menstruum to neutralize the same and form the ammonium salt of said mono-sulfuric acid ester, heating the mixture at a temperature within the range of 130°–175° C. and recovering methacrylamide therefrom.

8. A method of preparing methacrylamide which includes the steps of heating the ammonium salt of the mono-sulfuric acid ester of α-hydroxy, α-methyl propionamide at a temperature sufficient to form methacrylamide and ammonium bisulfate and recovering the methacrylamide therefrom.

9. A method of preparing acrylamide which includes the steps of heating the ammonium salt of the mono-sulfuric acid ester of β-hydroxypropionamide at a temperature sufficient to form acrylamide and ammonium bisulfate and recovering the acrylamide therefrom.

HAROLD S. DAVIS.
MYRL LICHTENWALTER.
WOLFGANG M. ZEISCHKE.

REFERENCES CITED

The following references are of record in the file of this patent:

UNITED STATES PATENTS

| Number | Name | Date |
|---|---|---|
| 2,175,805 | Jacobson | Oct. 10, 1939 |
| 1,581,621 | Trusler | Apr. 20, 1926 |
| 2,140,469 | Crawford et al. | Dec. 13, 1938 |

OTHER REFERENCES

Bruylant's, "Bulletin de L'Academie Royale de Belgraque," (5) 13 (1927), pp. 767 to 781.